United States Patent [19]
Raus

[11] Patent Number: 5,116,439
[45] Date of Patent: May 26, 1992

[54] METHOD AND PRODUCT FOR FLOOR COVERING INSTALLATION AND REMOVAL

[75] Inventor: Frank J. Raus, Morris, Ill.

[73] Assignee: Sponge-Cushion, Inc., Morris, Ill.

[21] Appl. No.: 309,354

[22] Filed: Feb. 13, 1989

[51] Int. Cl.$^5$ ............................................... E04B 2/00
[52] U.S. Cl. ........................................ 156/71; 52/98;
  52/746; 156/254; 156/344; 428/43; 428/246
[58] Field of Search .................... 156/71, 344, 254;
  52/746, 98; 428/43, 246

[56] References Cited

U.S. PATENT DOCUMENTS

| | | | |
|---|---|---|---|
| 2,368,024 | 1/1945 | Himmell | 156/254 |
| 4,824,498 | 4/1989 | Goodwin et al. | 156/344 |
| 4,853,280 | 8/1989 | Poteet | 428/246 |

FOREIGN PATENT DOCUMENTS

| | | |
|---|---|---|
| 0030100 | 6/1981 | European Pat. Off. . |
| 0043714 | 1/1982 | European Pat. Off. . |
| 1376262 | 12/1974 | United Kingdom . |
| 1416684 | 12/1975 | United Kingdom . |

Primary Examiner—John J. Gallagher
Attorney, Agent, or Firm—Lee, Mann, Smith, McWilliams, Sweeney & Ohlson

[57] ABSTRACT

A method and apparatus for permitting ready removal of a floor covering through the use of a two-component release web secured between the floor covering and the floor such that the floor covering may be peeled from the floor leaving one portion of the release web secured to the floor covering and the other portion of the release web secured to the floor, thus permitting reuse of the floor covering in another location and permitting ready installation of a new floor covering over the portion of the release web secured to the floor.

40 Claims, 1 Drawing Sheet

METHOD AND PRODUCT FOR FLOOR COVERING INSTALLATION AND REMOVAL

BACKGROUND OF THE INVENTION

This invention relates to a method for installation of a floor covering such as carpet to cause the floor covering to firmly adhere to the floor throughout its intended time in place, usually for a period of years, and to still permit ready removal leaving the floor in condition for subsequent installation of another floor covering without further preparation. The invention also relates to a two-component release web which makes the installation and removal system practical. For expediting further explanation the invention will be described in connection with carpet installation, but it will be understood from the more detailed explanation which follows that the method and product are broadly applicable to floor coverings in general.

Carpet installation is usually accomplished by one of three major systems, tacking down, stretching between "tackles" strips, and adhering the carpet to the floor through the use of adhesives. This invention relates to the third of these methods, adhesive carpet installation in which a cushion is first glued to the floor surface and the carpet itself is then glued to the upper surface of the cushion. One such adhesive carpet installation system is that of the assignee of this invention, identified as the "DUBL-STIK" carpet installation system.

Adhesive carpet installation systems have become quite popular in recent years and, indeed, are no more expensive or time consuming to employ than quality tackless systems. Nevertheless, adhesive carpet installation systems prior to the present invention have been plagued by problems encountered upon removal of the carpet at the end of its useful life or for reinstallation at another site. Upon removal of prior art adhesively installed carpets the adhesive remains on the floor after removal of the carpet; removal of the adhesive is expensive and time-consuming. Furthermore, when the carpet and cushion combination is removed, pieces of the cushion often peel off and are left with the adhesive on the floor, adding to the problem of adhesive removal. Moreover, peeling off of segments of the cushion upon carpet removal render the carpet and cushion combination unusable for installation at another site. In addition, the old glue which remains on the floor surface is often still tacky when uncovered and sticks to the bottoms of the shoes of installers as they work on the floor toward the end of installing new carpet.

PRIOR ART ADHESIVE CARPET INSTALLATION

Since the advent of modern adhesive carpet installation systems in the last ten or fifteen years, the problems involved in carpet removal and reinstallation have never been satisfactorily addressed. Many prior art systems have been devised in an attempt to solve the problems and to thereby provide for ready removal of used carpet without destroying subsequent usefulness of the used carpet, while leaving the floor surface in condition for installation of new carpet without undue preparation.

For example, Aitchison et al U.S. Pat. No. 4,075,377 discloses an adhesive bonding system for carpet installation employing a mesh material which underlies the carpet cushion. The mesh material utilized by Aitchison et al is loosely woven so that an adhesive may be sprayed over the mesh. Part of the adhesive passes through holes in the mesh to the floor surface. When the carpet with its underlayment is installed over the mesh/adhesive combination, a firm bond is formed with the floor after curing. Aitchison contends that, through use of a suitable mesh and adhesive, the mesh and the carpet may be subsequently peeled off of the floor without leaving substantial quantities of the backing still adhering to the floor. Since consistent achievement of the sought for result requires careful selection of adhesives and proper sizing of the holes in the mesh, successful employment of the Aitchison system seems more of an art than a science.

Another prior art adhesive carpet installation system aimed at easy installation and ready removal is disclosed in Howell U.S. Pat. No. 4,242,389. The Howell patent discloses a plurality of spaced apart segments with pressure sensitive adhesive on both sides to be employed in any desired pattern underneath a carpet web for securing the carpet to a floor surface. Howell also contemplates ready removal of the carpet through delamination of an elastomeric skin coat on the bottom of the backing of the carpet web. The adhesive segments utilized in the Howell system must be subsequently removed from the floor surface in order to permit installation of new carpet. Furthermore, delamination of the skin from the bottom of the carpet backing would appear to render the carpet unusable for reinstallation.

A further prior art attempt to solve the carpet removal and reinstallation problems of adhesively installed carpets appears in Wald U.S. Pat. No. 4,405,668. The Wald patent discloses the use of a grid-like "binder" which underlays a carpet or carpet tiles. The loosely woven strands of the binder are coated with a pressure release adhesive such that the binder is caused to firmly adhere to the underside of the carpet backing. Adherence to the floor surface is asserted by Wald to be such that ready removal of the carpet and binder combination may be accomplished without marring the floor, supposedly leaving the floor relatively clean after removal. The Wald system is similar to that of Aitchison et al and is thus subject to the same problems.

A prior art adhesive carpet installation system employing what is said to be a releasable cushion for the carpet assembly is the "Classic Dual Bond System" of Daltonian Carpet & Cushion, Inc. of Dalton, Ga. The Daltonian "Classic" system uses a carpet cushion with a "fuzzy" fibrous material bonded to one surface of the cushion. The cushion is glued to the floor surface with the "fuzzy" surface down through use of a pressure sensitive adhesive. The carpet itself is then glued to the upper surface of the cushion using the same pressure sensitive adhesive used to secure the cushion to the floor. It is contended by Daltonian that the "Classic" system renders the carpet assembly totally releasable. However, the "Classic" system does not satisfactorily deal with the problem of floor preparation required for installation of new carpet.

SUMMARY OF THE INVENTION

The present invention provides for installation of new carpet by the adhesive installation system at least as easily as by prior art "tackless" systems. When the time comes for removal, the carpet and cushion combination may be readily rolled up even after having been in place in heavy traffic areas for years. At the same time, when the old carpet and cushion combination is rolled up, the floor surface is left in a condition whereby new carpet may be installed without further surface preparation.

The floor covering installation and removal system according to the present invention utilizes carpets and cushions generally in accordance with those employed by prior art carpet installation systems, but with an important improvement. The present invention solves the problems of prior art adhesive carpet installation systems by employment of a release web through which a carpet or carpet and cushion assembly is secured to the floor surface, or through which the carpet and cushion are secured to one another. The method and product of the invention fully solve release and reinstallation problems which have long vexed those skilled in adhesive carpet installation.

The release web of the present invention utilizes a fabric-like material one surface of which may be permanently bonded to one surface of a carpet cushion or to the bottom surface of a carpet during manufacture. Alternatively, the release web may be adhesively secured to the cushion, or to the carpet, either during manufacture or during installation. The other surface of the release web is adapted for being adhesively secured to the carpet, to the cushion, or to the floor surface during carpet installation. In the usual installation where both carpet and cushion are utilized, a release web may be adhesively secured between the carpet and the cushion, between the cushion and the floor, or in both places. A pressure sensitive or multi-purpose adhesive may be used for any of these purposes.

The release web is formed with an internal parting plane which has sufficient shear and direct tension strength to cause the web to remain intact as long as the carpet or carpet and cushion assembly is in use. However, the parting plane is sufficiently weak in peel strength to permit the web to be deliberately split apart to form two separate components or sheets when removal of the carpet or carpet and cushion assembly is desired. Thus, the material of the web is such that when the carpet or carpet and cushion assembly is firmly adhered to the floor, the carpet or assembly will stay firmly in place as long as desired. At the end of the useful life of the carpet, or at any earlier time, the carpet or carpet and cushion assembly may be readily removed from the floor by peeling up one edge portion to permit continued peeling by rolling up the carpet or carpet and cushion assembly. The composition of the release web is such that when the material splits apart at the parting plane, one component remains secured to the carpet or cushion and the other component remains secured to the cushion or to the floor, depending upon where the release web had been placed during installation. If the carpet itself is not worn out, the carpet or carpet and cushion assembly is then reusable at another location. Furthermore, the portion of the web which remains on the top surface of the cushion or on the floor surface provides a smooth protective surface which prevents the bottoms of an installer's shoes from sticking to the old glue when installing a new carpet or a new carpet and cushion asssembly.

The easy release, easy reinstallation, and carpet reuse features of the invention are best achieved by forming the release web as a laminate, one portion of which is adhered to the carpet cushion during manufacture and the other portion of which is adapted to be glued to the floor during installation. While it is within the scope of the invention to form the release web of a single material which is separable along an internal parting plane, a web manufactured as a two-part laminate has thus far been found to be the most satisfactory. The two portions of the laminated release web are secured to one another at the parting plane in such a manner as to provide more than sufficient shear and direct tension strength for holding down an installed carpet or carpet and cushion combination throughout the useful life of the carpet; however, the peel strength is such that the carpet or carpet and cushion assembly may be readily removed at any time after installation by peeling up a corner or an edge of the carpet or the assembly whereby the release web separates at the release plane as the carpet or assembly are rolled up for removal.

When the carpet or carpet and cushion combination is thus peeled from the floor, one portion of the release web remains bonded to the bottom of the carpet or the cushion while the other portion remains cemented to the upper surface of the cushion or to the floor. The removed carpet or carpet and cushion assembly may subsequently be reprocessed, if desired, by securing a new release web to the bottom of the carpet or cushion to permit reinstallation according to the invention. In the alternative, the removed carpet or carpet and cushion combination may be subsequently installed elsewhere by conventional cementing.

For installing new carpet where the old carpet or carpet and cushion assembly was removed no further preparation of the upper surface of the cushion or of the floor is necessary inasmuch as a new carpet or cushion with a release web according to the present invention may be cemented directly to the portion of the old release web which remains on the top surface of the cushion or on the floor.

DETAILED DESCRIPTION OF THE INVENTION

Figure 1:
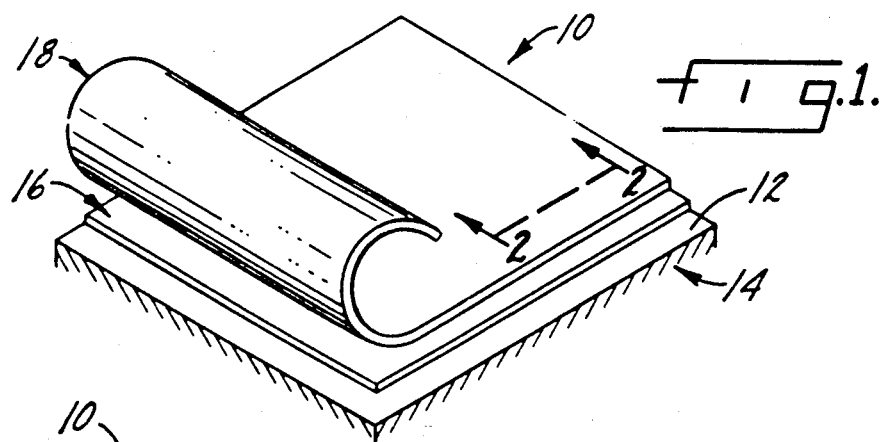
FIG. 1 is a fragmentary perspective view of a portion of a floor to which carpet and cushion are being installed according to the present invention.

FIG. 1 illustrates a segment of carpet assembly 10 according to the present invention which is being installed on the top surface 12 of a typical floor 14 formed of wood, concrete or other material. The carpet assembly 10 includes an underlayment or cushion 16 which is cemented in place on the floor surface 12 and a carpet 18 which is in the process of being cemented to the upper surface of the cushion 16.

The description thus far is typical of adhesive carpet installation according to the prior art, such as the "DUBL-STIK" carpet installation system of Sponge Cushion, Inc., the assignee of this application. However, as will be described, the system here employed is substantially improved over prior art systems in that the carpet assembly 10 may be subsequently removed from the floor at any time after installation and may be readily reused in a different location if not worn out. Furthermore, when the carpet assembly has been so removed, the surface 12 of the floor 14 is left in a condition for immediate installation of a new carpet assembly 10 without any further preparatory work and without any hindrance to the installer in installing the new carpet.

Figure 2:
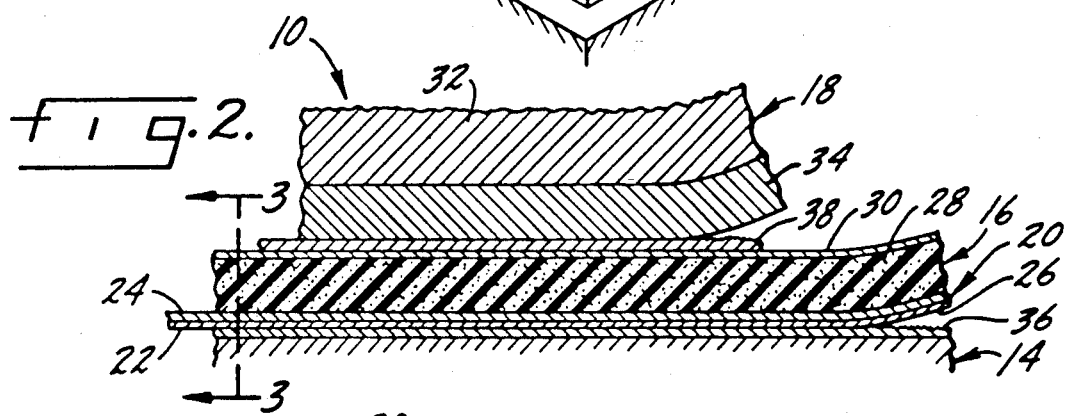
FIG. 2 is an enlarged fragmentary orthogonal sectional view taken generally along line 2—2 of FIG. 1 and schematically illustrating the sequence of the steps in the installation of cushion and carpet according to the present invention.
Figure 3:
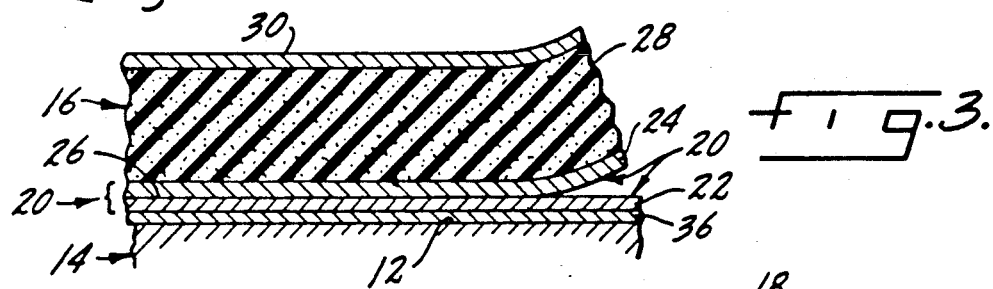
FIG. 3 is a further enlarged fragmentary sectional view taken along line 3—3 of FIG. 2 and schematically illustrating the carpet removal step according to the present invention.

The advantages of the present invention flow from the use of a special release web 20, which is secured to the bottom surface of the cushion 16 during manufacture of the cushion. The release web 20 is formed of a two-component fabric material. As best seen in FIGS. 2 and 3 the release web includes a solid, flexible, carded fiber membrane 22 to which a solids, flexible, non-woven, spun-bonded fiber membrane 24 is adhered, thus forming a two-component laminate. It has been found that a bi-web material of James River Corporation, designated APN 553, is well suited for the purposes of the invention. The APN 553 bi-web material includes a membrane 24 comprising a self-supporting non-woven nylon textile scrim layer having an open mesh and a membrane 22 comprising a non-woven rayon textile layer having a denser mesh than the nylon membrane 24. The two membranes of the APN 553 material are secured to one another by resin bonding technology using a latex adhesive. The inventor herein was informed that this bi-web material had been devised for use in manufacture of filters. It has been found by the inventor that this material provides the qualities necessary to achieve the purposes of the present invention.

An internal parting plane 26 is formed at the interface between the carded fiber membrane 22 and the spun-bonded fiber membrane 24 of the release web 20. The bonding between the two membranes 22 and 24 at the parting plane 26 provides substantial shear and tension strength, but the peel strength at the parting plane is substantially less. This causes the two membranes to be tightly secured to one another at the parting plane 26 to strongly resist separation in shear and in direct tension but permits the membranes to be deliberately peeled apart when desired.

Aside from employment of the release web 20 the cushion 16 may be of any conventional construction. It includes a solid and flexible cushion core 28 of suitable resilient, cellular cushioning material such as sponge rubber, jute, foamed polymer elastomers such as polyurethane foam, re-bonded polyurethane foam, synthetic fiber or any other cushioning material conventionally used for carpet underlayment. In this embodiment the cushion core 28 is formed of a high-quality sponge rubber, for example, PLIOFLEX sponge rubber of Goodyear Rubber Company. A membrane 30 is permanently bonded on or embedded in the top surface of the cushion core during manufacture of the cushion 16 in order to strengthen the surface. While the membrane 30 may be of any suitable material, the particular membrane 30 here illustrated may advantageously be formed of a non-woven nylon fabric manufactured by James River Corporation and identified by the trademark CEREX.

During manufacture of the cushion 16 the membrane 24 of the release web 20 is permanently bonded to the bottom of the central cushion core 28, by being cemented thereto or by embedding the membrane into the lower surface of the cushion core. This is accomplished in a manner such that the parting plane 26 at the interface between the membrane 22 and the membrane 24 is unaffected by bonding of the web 20 to the central core 28. Thus, the ability to readily peel the carded membrane 22 from the spun bonded membrane 24 is unimpaired.

The carpet 18 may be of any conventional construction. For example, it may comprise a carpet pile upper portion 32 of natural or synthetic fiber anchored to a backing 34 of woven or nonwoven material in conventional fashion. The backing of the carpet may also include a secondary backing material bonded to the bottom of the primary backing as is common, but this is not shown in order to simplify the drawings.

The sequence of steps for installing the cushion and carpet assembly 10 on the top surface of the floor 14 is best seen by reference to the schematic illustrations in FIG. 2. A pressure-sensitive or multi-purpose adhesive 36 is spread on the floor surface 12, and the cushion 16 is then installed in the desired position over the adhesive covered floor with the release web 20 down. This may be accomplished, for example, by rolling the cushion into place as schematically illustrated in the lower portion of FIG. 2. The characteristics of the adhesive 36 and the material of the membrane 22 of the release web 20 are chosen such that the adhesive firmly bonds the membrane 22 to the floor surface but does not impair the ability for peeling the membrane 22 from the membrane 24.

Installation of the carpet 18 is schematically illustrated in the upper portion of FIG. 2. A conventional carpet adhesive 38 is spread on the upper surface of the cushion 16 after it has been adhesively secured to the floor, and the carpet 18 is then placed over the adhesive covered cushion with the backing 34 down. This may be accomplished in the conventional fashion by carefully locating the carpet on the cushion and then rolling it into place as illustrated in the upper portion of FIG. 2. This completes installation of the carpet assembly 10. The carpet assembly will thereafter remain firmly in place on the floor for as long as desired, normally throughout the useful life of the carpet 18.

According to the invention, the shear and direct tension strengths of the bond between the membranes 22 and 24 at the parting plane 26 are more than sufficient to prevent any undesired separation between the membranes at any time during the time the carpet assembly remains installed. When it is desired to remove the carpet assembly, however, this may be readily accomplished, as schematically illustrated in FIG. 3, by first peeling up a corner or edge of the cushion 16. This causes the corner or edge portion of the release web 20 to separate at the parting plane 26. Removal of the entire carpet assembly 10 may then be readily accomplished by rolling it up, which is permitted by continued progressive peeling of the release web 20 at the parting plane 26.

After removal of the carpet assembly 10 as described, the membrane 22 remains firmly adhered to the surface of the floor 14. Accordingly, without any further preparation of the floor a new cushion and carpet assembly may be cemented in place in the manner described for installation of the carpet assembly 10, with the membrane 22 providing a completely adequate surface for firm adhesion of a new carpet assembly. This provides one of the improvements accomplished by the present invention.

Further in accordance with the invention, the membrane 22 which remains on the floor surface after removal of the carpet assembly 10 prevents any impairment of free movement of the installer of a new carpet. Specifically, the membrane 22 prevents the bottoms of the installer's shoes from sticking to the old adhesive as he installs the new carpet assembly. Until new adhesive is applied, the installer is free to move about on the floor surface and to readily shift the new cushion to be installed into the desired position before spreading the new cement.

A further improvement of the present invention is achieved through the peeling of the two membranes of the release web 20 at the parting plane 26 upon removal of the carpet assembly 10. Because the non-strippable membrane 24 of the web 20 remains intact on the bottom surface of the removed carpet assembly 10, the bottom surface is in condition for installation of the removed carpet at another site. If desire, the carpet assembly may be reprocessed to install a new release web 20 to the bottom of the cushion without requiring removal of the old membrane 24. Therefter, the entire carpet assembly 10 may be adhesively adhered to the floor at the new site and will remain firmly in place for as long as desired, while still permitting ready removal at some subsequent time in accordance with the invention.

EMBODIMENT OF FIG. 4

Figure 4:
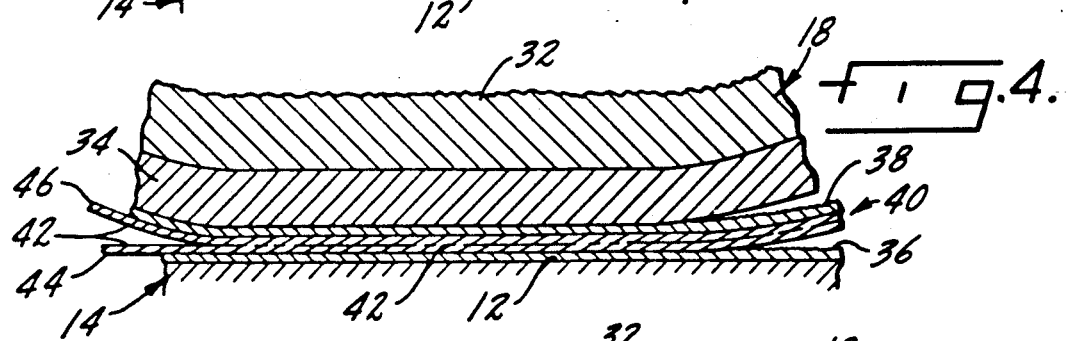
FIG. 4 is a fragmentary sectional view similar to FIG. 2 and on the same scale, schematically illustrating the sequence of steps in installation of a second embodiment of the invention.

A second embodiment of the invention is illustrated in FIG. 4. In this embodiment no carpet cushion is utilized. Instead, the carpet 18 is installed directly on the upper surface 12 of the floor 14 by means of a modified release web 40. A pressure-sensitive or multi-purpose adhesive 36 is spread on the floor surface in the same manner as described in connection with the embodiment of FIG. 2. The modified release web 40 is then rolled into place and adhered to the floor surface. The performance of this step is schematically illustrated in the right-hand bottom portion of FIG. 4.

After the modified release 40 has been adhesively secured to the floor surface 12, conventional carpet adhesive 38 is spread on the upper surface of the release web 40, and then the carpet 18 is carefully located and rolled into place as schematically illustrated in the right-hand upper portion of FIG. 4, with the understanding that the release web 40 will be firmly adhered to the floor surface 12 before the carpet 18 is installed. This completes installation of the carpet, which will remain firmly in place for as long as desired.

The release web 40 is modified in that in the embodiment of FIG. 4 the release web 40 is formed of a single material which is separable along an internal parting plane 42, shown by a phantom line in the figure. The material of the web is sufficiently weak in peel strength at the parting plane 42 to permit the web to be deliberately split apart to form two separate components or membranes 44 and 46 as schematically illustrated at the left-hand edge of FIG. 4. The release web 40 is formed with sufficient shear and direct tension strength at the parting plane 42 to cause the web to remain intact as long as the carpet is in use. At the end of the useful life of the carpet, or at any earlier time, the carpet may be readily removed from the floor by peeling up one edge portion to cause the web 40 to peel apart at the parting plane 42 as illustrated in FIG. 4. As the carpet is rolled up the web continues to peel apart as described in connection with the embodiment of FIGS. 2 and 3. This leaves the bottom membrane component 44 adhesively secured to the floor surface and the upper membrane portion 46 adhesively secured to the bottom of the carpet backing 34. If the carpet is not worn out, it is then reusable at another location. The membrane 44 which remains adhered to the floor surface provides a smooth protective surface which allows an installer free movement on the surface and prevents the bottoms of his shoes from sticking to the old glue when installing a new carpet or a new carpet and cushion assembly.

THE EMBODIMENT OF FIG. 5

Figure 5:
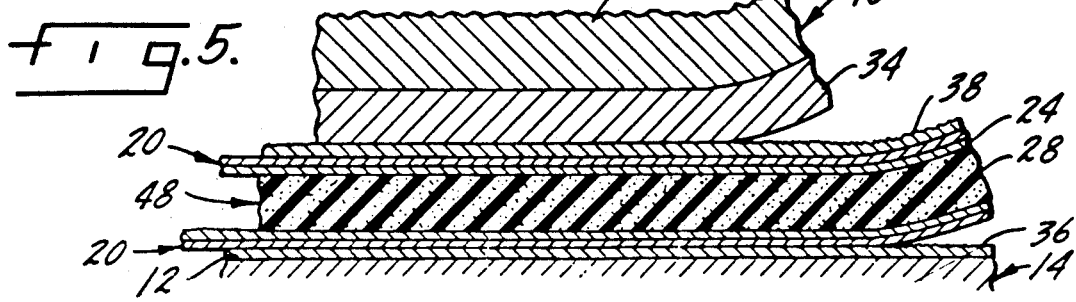
FIG. 5 is a fragmentary sectional view similar to FIGS. 2 and 4 and on the same scale, schematically illustrating the sequence of steps in installation of a third embodiment of the invention.

FIG. 5 illustrates a third embodiment of the invention utilizing two release webs. This embodiment utilizes a cushion underneath the carpet in a manner similar to the embodiment of FIG. 2. As illustrated, a modified cushion 48 is used in place of the cushion 16 of FIG. 2. The cushion 48 includes a central core 28 like that of the cushion 16 with a release web 20 bonded or adhesively secured to the bottom surface as described in connection with FIG. 2. In place of the membrane 30 of FIG. 2 another release web 20 is bonded or adhesively secured to the upper surface of the core 28, with the spun-bonded fiber membrane 24 secured to the core.

The modified cushion 48 is adhesively secured on the surface 12 of the floor 14 through the use of an adhesive such as the adhesive 36. The installation of the cushion is schematically illustrated at the bottom right hand portion of FIG. 5 and is as described in connection with the embodiment of FIG. 2. After the cushion 48 has been secured in place, a carpet such as the carpet 18 of the embodiment of FIG. 2 is installed on top of the cushion by means of adhesive such as the adhesive 38. As schematically illustrated at the right hand upper portion of FIG. 5, after the adhesive has been spread on the upper surface of the release web 20 on top of the cushion, the carpet 18 is then located and rolled into place.

By using two release membranes 20 as described in this embodiment the entire carpet assembly including the carpet 18 and the pad 48 may be removed from the floor as described in connection with the embodiment of FIG. 2. In the alternative, the edge of the carpet 18 may be peeled up and then the carpet itself may be rolled up and removed, leaving the cushion 48 in place for installation of a new carpet. This provides versatility in the installation, permitting replacement of the carpet when worn but not requiring replacement of a cushion which may still be in good condition.

GENERAL

It should be understood that in place of one or both of the release webs 20 as shown and described in connection with the embodiments of FIGS. 2 and 5 a separate release web or separate release webs 40 may be utilized as described in connection with the embodiment of FIG. 4.

While the present invention has been described in connection with installation of carpet, it should be understood that the method and release cushion of the invention are equally applicable to installation of other floor coverings, for example, tile, carpet tile, parquet, etc. Such other follor coverings, when adhesively installed utilizing a release web as explained above, will permit such floor coverings to remain firmly in place for as long as desired and will still permit ready removal when desired and will provide the other advantages of the invention as previously explained.

It is also within the scope of the present invention to form the release web 20 or the release web 40 of materials other than fabric. For example, paper or synthetic materials may be used in place of fabric. The term "fabric-like" is utilized in the claims to encompass materials such as fabric, paper and other flexible sheet materials.

Variations and modifications may be effected without departing from the scope of the novel concepts of the present invention.

I claim:

1. A method for installation and removal of a floor covering on the surface of a floor, comprising the steps of:
   (a) forming a web of fabric-like material having two separable portions secured to one another at a parting plane,
   (b) securing one portion of said web to the bottom surface of the floor covering, and
   (c) securing the other portion of said web to the surface of the floor, whereby said floor covering may be removed from the floor by peeling said web apart at the parting plane.

2. The method of claim 1 including the step of forming said web with said two separable portions secured to one another to provide sufficient resistance against shearing apart and against pulling apart in direct tension to cause the floor covering to be firmly secured to the floor until deliberate removal by peeling said web apart.

3. The method of claim 2 in which said separable portions are secured to one another by cementing.

4. The method of claim 2 in which said web is formed of a single material with said separable portions integrally joined at said parting plane.

5. The method of claim 1 employing a cushion between the floor covering and the floor, comprising the steps of
   (a) securing said web to the bottom of said cushion, and
   (b) securing said floor covering on the top of said cushion, whereby said floor covering and said cushion may be removed from the floor as a unit by peeling said web apart at the parting plane.

6. The method of claim 1 employing a cushion between the floor covering and the floor, comprising the steps of:
   (a) securing said cushion on said floor, and
   (b) securing said web between the bottom surface of the floor covering and the top surface of the cushion, whereby said floor covering may be removed from the cushion by peeling said web apart at the parting plane.

7. The method of claim 1 in which said other portion of the web remains secured to the floor after said floor covering is removed to leave the floor in condition for installation of a new floor covering without further preparation.

8. The method of claim 1 including the step of applying an adhesive on the floor for securing said other portion of the web to the floor, whereby said other portion remains secured to the floor after the floor covering is removed, and whereby said other portion covers the adhesive on the floor and provides a protective surface which prevents the bottoms of an installer's shoes from sticking to the adhesive when installing a new floor covering on the floor.

9. In a system for removably securing a floor covering on a floor surface, the improvement comprising:
   (a) a web of fabric-like material having opposite surfaces, one of which is adapted for being secured to the bottom surface of the floor covering and the other of which is adapted for being secured to the floor surface, for installing the floor covering in operable position on the floor surface,
   (b) an internal parting plane formed in the web between said surfaces and separating the web into two portions, and
   (c) means for securing said two portions of the web to one another with sufficient strength to prevent unintended separation of the two portions when the floor covering is installed inoperable position on the floor surface but permitting the one portion to be peeled from the other portion to provide for itentional removal of the floor covering from the floor surface.

10. The system of claim 9 in which said means for securing said two portions of said web comprises an adhesive.

11. The system of claim 9 in which the two portions of said web are foprmed of two different fabric-like materials, and in which said means for securing said twoportions comprises an adhesive.

12. The system of claim 9 in which said means for securing said two portions of said web comprises forming the web of a single material with the two portions secured to one another to provide sufficient resistance against shearing apart in direct tension to prevent unintended separation but to permit deliverate peeling apart at the aprting plane for deliverate removal of the floor covering.

13. A laminate comprising:
   A. a solid, flexible, resilient, cellular layer having a top surface for bonding to an underside of a surface covering and an opposing bottom surface;
   B. a solid, flexible, non-strippable first layer having opposing first and second surfaces, wherein the first surface of the first layer is adhered to the bottom surface of the cellular layer;
   C. a solid, flexible, second layer adhered to the second surface of the first layer; and
   D. a surface covering adhesively bonded to the top surface of the cellular layer;
   wherein, when the second layer of the laminate is secured to a solid support and the surface covering is pulled aaway from the solid support, the second layer adheres to the support and the surface covering, cellular layer, and first layer are strippable from the second layer.

14. The laminate as claimed in claim 13, wherein the cellular layer is comprised of sponge rubber.

15. The laminate as claimed in claim 13, wherein the cellular layer is comprised of a foamed polymer.

16. The laminate as claimed in claim 15, wherein the foamed polymer is an elastomer.

17. The laminate as claimed in claim 13, wherein the first layer and the second layer are each comprised of a textile material.

18. The laminate as claimed in claim 17, wherein the textile material is a nonwoven fabric.

19. The laminate as claimed in claim 18, wherein the first layer is comprised of a nonwoven scrim material.

20. The laminate as claimed in claim 18, wherein the first layer is a spunbonded nylon fabric.

21. The laminate as claimed in claim 18, wherein the second layer is a nonwoven fabric comprised of carded, rayon fibers.

22. The laminate as claimed in claim 18, wherein the first layer is adhesively bonded to the second layer.

23. A cushion underlay for a carpet, wherein the cushion underlay comprises:
   A. a solid, flexible, resilient, cellular layer having a top surface for bonding to an underside of a carpet and an opposing bottom surface;
   B. a self-supporting, flexible, nonwoven, scrim textile layer having an open mesh and opposing first and second surfaces, wherein the first surface of the scrim layer is adhered to the bottom of the cellular layer;
   C. a self-supporting, flexible, nonwoven, textile web having a denser mesh than the open mesh of the scrim layer, wherein said web is adhesively bonded to the second surface of the scrim layer;
wherein, when the scrim layer is secured to solid support and the cushion underlay is pulled away from the solid support, the scrim layer is strippable from the textile web without tearing the cellular layer, but the cellular layer is not strippable from the scrim layer.

24. Cushion underlay as claimed in claim 23, wherein the cellular layer is comprised of sponge rubber.

25. Cushion underlay as claimed in claim 23, wherein the scrim layer is a spunbonded web.

26. Cushion underlay as claimed in claim 25, wherein the textile web is a carded web.

27. A laminate comprising:
   A. a cushion underlay as claimed in claim 23; and
   B. a carpet adhesively bonded to the top surface of the cellular layer;
wherein the carpet is not strippable from the cellular layer.

28. Laminate as claimed in claim 27, wherein the nonwoven textile web is secured to a floor, with an adhesive in an amount such that the scrim layer is strippable from the nonwoven web, but the nonwoven web is not strippable from the floor.

29. Method of installing a strippable surface covering and cushion underlay ona solid support, wherein the method comprises:
   A. providing a cushion underlay for the surface covering, wherein the cushion underlay comprises
      1. a solid, flexible, resilient, cellular layer having a top surface for bonding to an underside of a surface covering and an opposing bottom surface;
      2. a solid, flexible, non-strippable first layer having opposing first and second surfaces, wherein the first surface of the first layer is adhered to the bottom surface of the cellular layer; and
      3. a solid, flexible, second layer adhered to the second surface of the first layer;
   B. adhesively securing the cushion underlay to a solid support; and
   C. adhesively securing the surface covering to the top surface of the cellular layer;
wherein the second layer adheres to the support, and the surface covering, cellular layer and first layer are strippable from the second layer when the surface covering is pulled away from the support.

30. Method as claimed in claim 29, wherein the first layer and the second layer are comprised of nonwoven textile materials.

31. Method as claimed in claim 30, wherein the first layer is comprised of a nonwoven, spunbonded material and the second layer is comprised of nonwoven web of carded rayon fibers.

32. Method as claimed in claim 29, which comprises the additional step of stripping the surface covering, cellular layer and first layer from the second layer.

33. Method as claimed in claim 32, wherein the first layer and the second layer are comprised of nonwaven textile materials.

34. Method as claimed in claim 33, wherein the first layer is comprised of a nonwoven spunbonded nylon material and the second layer is comprised of nonwoven web of carded rayon fibers.

35. Method of installing a strippable surface covering and cushion underlay on a solid support, wherein the method comprises:
   A. providing a cushion underlay for the surface covering, wherein the cushion underlay comprises the cushion underlay as claimed in claim 23;
   B. adhesively securing the cushion underlay to a solid support; and
   C. adhesively securing the surface covering to the top surface of the cellular layer;
wherein the second layer adheres to the support, and the surface covering, cellular layer and first layer are strippable from the second layer when the surface covering is pulled away from the support.

36. Method as claimed in claim 35, wherein the first layer and the second layer are comprised of nonwoven textile materials.

37. Method as claimed in claim 36, wherein the first layer is comprised of a nonwoven, spunbonded nylon material and the second layer is comprised of nonwoven web of carded rayon fibers.

38. Method as claimed in claim 35, which comprises the addition step of stripping the surface covering, cellular layer and first layer from the second layer.

39. Method as claimed in claim 38, wherein the first layer and the second layer are comprised of nonwoven textile materials.

40. Method as claimed in claim 39, wherein the first layer is comprised of a nonwoven spunbonded nylon material and the second layer is comprised of nonwoven web of carded rayon fibers.

* * * * *